(12) United States Patent
Nedderman, Jr.

(10) Patent No.: US 6,365,890 B1
(45) Date of Patent: Apr. 2, 2002

(54) UNDERWATER OPTICAL LOAD CELL SYSTEM

(75) Inventor: William H. Nedderman, Jr., Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/413,090

(22) Filed: Oct. 5, 1999

(51) Int. Cl.[7] .................................................. G01D 5/34
(52) U.S. Cl. .............................. 250/227.14; 250/231.1; 73/800
(58) Field of Search ....................... 250/227.14, 227.18, 250/227.28, 227.29, 229, 231.1; 359/157; 385/12, 13; 73/655, 800

(56) References Cited

U.S. PATENT DOCUMENTS

| | | | | |
|---|---|---|---|---|
| 4,805,461 A | * | 2/1989 | Gupta et al. ................... | 73/800 |
| 4,825,069 A | * | 4/1989 | Hutchisson et al. ......... | 250/229 |
| 5,359,445 A | * | 10/1994 | Robertson .................... | 359/151 |
| 6,276,215 B1 | * | 8/2001 | Berg ........................... | 73/800 |

\* cited by examiner

*Primary Examiner*—John R. Lee
(74) *Attorney, Agent, or Firm*—Michael J. McGowan; James M. Kasischke; Prithvi C. Lall

(57) ABSTRACT

A system is provided for detecting movement of an object underwater. A housing positioned underwater defines a gas-filled cavity receiving an optical reflector that is fixedly coupled to an object underwater. At least one optical sensor is adjustably positioned with its optical sensing portion located in the cavity a desired distance from the optical reflector. Movement of the object underwater causes movement of the optical reflector that is detected by the optical sensing portion.

12 Claims, 1 Drawing Sheet

UNDERWATER OPTICAL LOAD CELL SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to underwater load cells, and more particularly to a optical load cell that detects movement of a body underwater.

(2) Description of the Prior Art

Load cells or shear webs are used in a variety of underwater drag test applications. Briefly, these devices are types of strain gauges that measure movement of an object underwater due to a fluid flow moving thereover. While these devices are suitable for some applications, they are unreliable when used in the presence of high electric currents. Specifically, since the strain gauges operate on very low current, the presence of high current levels can electrically interfere with the low current strain gauges. For example, high current levels are present when underwater drag tests are performed on electrically-powered exterior panels that make up part of a magneto-hydrodrive propulsion system.

SUMMARY OF THE INVENTION

Accordingly, it is an object of the present invention to provide a load cell device that is insensitive to the presence of high electric current levels.

Another object of the present invention is to provide load cell device that can operate underwater.

Still another object of the present invention is to provide a load cell device that can be adjusted from a remote location in order to avoid unwanted disturbances in a surrounding fluid flow.

Other objects and advantages of the present invention will become more obvious hereinafter in the specification and drawings.

In accordance with the present invention, a system is provided for detecting movement of an object underwater. A housing positioned underwater defines a gas-filled cavity. An optical reflector is fixedly coupled to an object underwater. A portion of the optical reflector is positioned in the cavity. At least one optical sensor is provided with each optical sensor having a body portion coupled to an optical sensing portion. An adjustable positioning system positions the optical sensing portion in the cavity a desired distance from the optical reflector. Movement of the object underwater causes movement of the optical reflector that is detected by the optical sensing portion.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
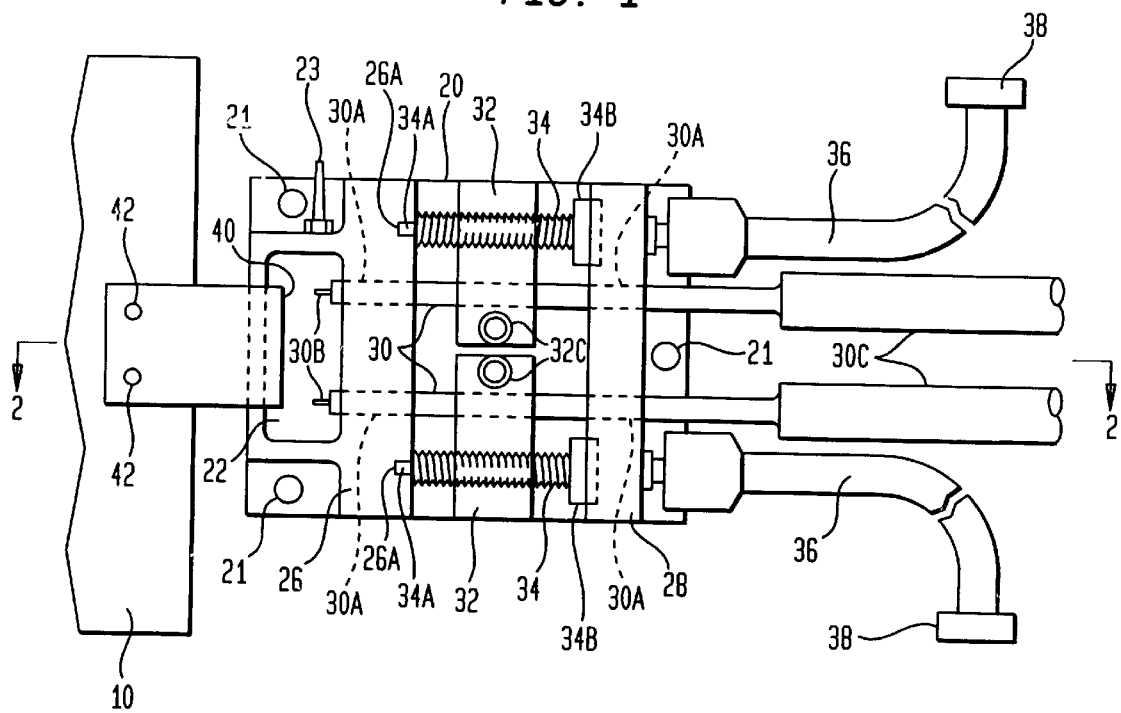
FIG. 1 is a bottom view of the underwater optical load cell system according to an embodiment of the present invention.
Figure 2:
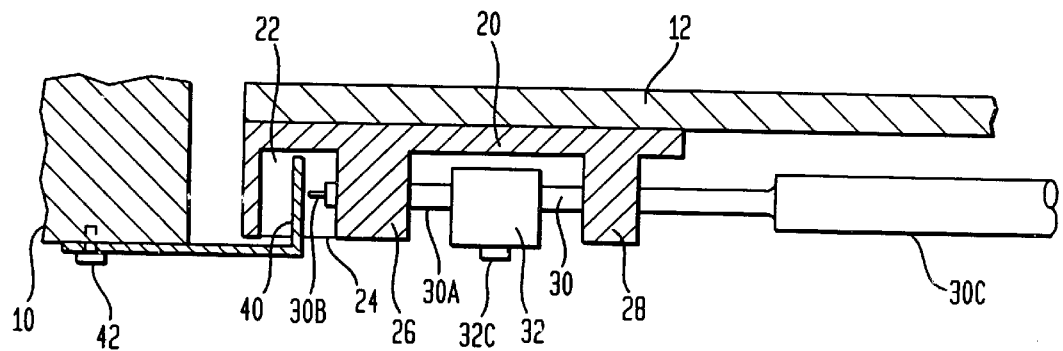
FIG. 2 is a cross-sectional view of the underwater optical load cell system taken along 2—2 in FIG. 1.

Referring now to the drawings, and more particularly to FIGS. 1 and 2, an underwater optical load cell system in accordance with an embodiment of the present invention is illustrated in bottom and cross-sectional views, respectively. By way of example, the present invention will be described for its use in detecting movement of a test surface 10 (shown in portion) supported in a test bed (not shown). Support of test surface 10 is such that test surface 10 can move due to drag forces when a fluid flows thereover. Accordingly, it will be assumed herein that test surface 10 and the optical load cell system of the present invention are submerged underwater. Test beds for supporting test surface 10 are well known in the art and do not comprise a part of the present invention or limit the scope thereof. Indeed, as will be apparent to one of ordinary skill in the art, the present invention can be used to detect small amounts of movement of any object underwater.

A rigid housing 20 serves as a base for supporting most of the load cell systems components. Housing 20 is attached to a fixed object (e.g., a test bed or frame) 12 using, for example, screw holes 21 in housing 20. Housing 20 is configured to define a cavity 22 open at one end 24. When positioned underwater, open end 24 faces downward as shown in FIG. 2. Cavity 22 can have a gas supply port 23 coupled thereto to provide for the introduction of a gas into cavity 22 as will be explained further below.

Attached to or integrated into (as shown) housing 20 are spaced apart supports 26 and 28 for supporting the main body portion 30A of one or more optical sensors 30 (e.g., two optical sensors 30 are shown in the illustrated embodiment) in a way that optical sensor 30 can move axially. The optical sensing portion 30B of each optical sensor 30 is positioned inside of cavity 22. A sensor cable 30C passes through body portion 30B and is coupled to optical sensing portion 30B. Each sensor cable 30C is led to remotely located measuring equipment (not shown). Although two optical sensors 30 are shown, it is to be understood that one or more than two optical sensors can be used without departing from the scope of the present invention. Optical sensor 30 can be any one of a variety of commercially available optical sensors such as MTI 2000 Fotonic Sensors manufactured by Mechanical Technology, Inc., Instrument Division, Latham, N.Y.

Figure 3:
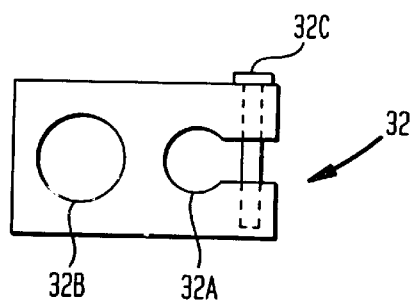
FIG. 3 is an end view of one of the clamps used in the optical load cell system.

Clamped to each body portion 30B is a clamp 32 having a clamping aperture 32A and a threaded aperture 32B as best seen in FIG. 3. Clamping aperture 32A receives body portion 30A therethrough and is tightened thereagainst as a tightening screw 32C reduces the diameter of clamping aperture 32A. Such clamping arrangements are well known in the art. Threaded aperture 32B threadably receives an axial position adjustment screw 34.

Screw 34 is rotationally supported but axially restrained at either end thereof at supports 26 and 28. For example, a distal tip 34A can be rotationally supported but axially restrained in a pilot hole 26A formed in support 26. Head end 34B of screw 34 is rotationally supported but axially restrained in support 28.

Coupled to each screw 34 at its head end 34B is a control cable 36 that terminates at a remote location in a knob 38.

Control cable 36 functions to rotate screw 34 when knob 38 is rotated. Such control cables are known in the art and are commercially available flex shafts from Stockdrive Components, 2101 Jericho Turnpike, New Hyde Park, N.Y.

Positioned in cavity 22 opposite optical sensing portion(s) 30B is an optical reflector 40. Optical reflector 40 is rigidly coupled to test surface 10 by, for example, screws 42.

In operation, optical reflector 40 is coupled to test surface 10 and housing 20 is placed underwater such that a portion of optical reflector 40 resides in cavity 22 opposite optical sensing portion(s) 30B. That is, housing 20 is positioned in the water such that open end 24 faces downward as described above. By doing this, a gaseous air bubble may naturally form in cavity 22 so that optical reflector 40 and optical sensing portion(s) 30B remain in a dry, gaseous environment. However, if some water fills cavity 22 or to ensure the maintenance of a gaseous environment in cavity 22, a gas supply (not shown) can be coupled to gas supply port 23 to provide for the introduction of gas into cavity 22. A gaseous environment is desirable for optical measurements when the environmental water is murky.

Each knob 38 is turned to move the corresponding optical sensor 30 axially. That is, as knob 38 is turned, control cable 36 causes rotation of screw 34. Since screw 34 is threadably engaged in clamp 32 while being axially restrained, rotation of screw 34 causes axial movement of clamp 32 and optical sensor 30. In this way, optical sensing portion 30B is moved closer or further from optical reflector 40 for purposes of calibration or for specific measurement requirements. Thus, each optical sensor 30 can be independently and adjustably positioned so that each optical sensing portion 30B is a desired distance away from optical reflector 40. The desired distance could be the same or different depending on the application. For example, the same distance could be used when a redundant measurement system is desired. In the case where different distances are used, the optical sensor associated with the greater distance will be sensitive to larger amounts of movement while the optical sensor associated with the smaller distance will be sensitive to smaller amounts of movement.

The advantages of the present invention are numerous. Once the load cell system is calibrated and the desired distances between optical sensing portion(s) 30B are set, movement of optical reflector 40 (caused by movement of test surface 10) is detected by optical sensing portion(s) 30B. The optical sensors are not affected by high electric current levels. Further, the load cell system can operate underwater and can be calibrated/adjusted from a remote location.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for detecting movement of an object underwater, comprising:
    a housing positioned underwater and defining a gas-filled cavity;
    an optical reflector fixedly coupled to an object underwater and having a portion thereof positioned in said cavity;
    at least one optical sensor having a body portion coupled to an optical sensing portion; and
    means coupled to said housing and to said optical sensor for adjustably positioning said optical sensing portion in said cavity a desired distance from said optical reflector, wherein movement of the object underwater causes movement of said optical reflector that is detected by said optical sensing portion.

2. A system as in claim 1 further comprising a gas supply port joined to said housing and in communication with said cavity for allowing the introduction of a gas into said cavity wherein said optical reflector and said optical sensing portion can be maintained in a gaseous environment when said housing is underwater.

3. A system as in claim 1 wherein said cavity is open on one side thereof, and wherein said housing is positioned underwater such that said one side faces downward.

4. A system as in claim 1 wherein said means comprises:
    a support coupled to said housing for supporting said body portion and allowing axial movement of said body portion and said optical sensing portion;
    a clamp coupled to said body portion; and
    a positioner coupled to said clamp for moving said clamp coupled to said body portion in a direction that causes said axial movement of said body portion and said optical sensing portion.

5. A system as in claim 4 wherein said positioner is controllable from a remote location.

6. A system for detecting movement of an object underwater, comprising:
    a housing positioned underwater and defining a gas-filled cavity;
    an optical reflector fixedly coupled to an object underwater and having a portion thereof positioned in said cavity;
    at least one optical sensor having a body portion coupled to an optical sensing portion;
    first and second supports spaced apart from one another and fixedly coupled to said housing, each of said first and second supports supporting said body portion and allowing axial movement of said body portion and said optical sensing portion;
    a clamp coupled to said body portion and positioned between said first and second supports; and
    a screw threadably coupled to said clamp and cooperating with said first and second supports wherein rotation of said screw moves said clamp to cause said axial movement of said body portion to position said optical sensing portion in said cavity a desired distance from said optical reflector, wherein movement of the object underwater causes movement of said optical reflector that is detected by said optical sensing portion.

7. A system as in claim 6 further comprising a gas supply port joined to said housing and in communication with said cavity for allowing the introduction of a gas into said cavity wherein said optical reflector and said optical sensing portion can be maintained in a gaseous environment when said housing is underwater.

8. A system as in claim 6 wherein said cavity is open on one side thereof, and wherein said housing is positioned underwater such that said one side faces downward.

9. A system as in claim 6 further comprising a control cable coupled to said screw for turning said screw from a remote location.

10. A system as in claim 6 wherein said at least one optical sensor comprises a plurality of optical sensors, and wherein each of said plurality of optical sensors has a corresponding combination of said first and second supports, said clamp and said screw associated therewith.

11. A system for detecting movement of an object underwater, comprising:

a housing defining an open-ended cavity in a portion thereof;

a gas supply port coupled to said housing and in communication with said cavity for allowing the introduction of gas into said cavity wherein said cavity can be maintained in a gaseous environment when said housing is underwater;

an optical reflector fixedly coupled to an object underwater and having a portion thereof positioned in said cavity when said housing is underwater;

a plurality of optical sensors, each of said plurality of optical sensors having a body portion and an optical sensing portion;

a remotely controllable means coupled between said housing and said plurality of optical sensors for independently and adjustably positioning each said optical sensing portion in said cavity a desired distance from said optical reflector, wherein movement of the object underwater causes movement of said optical reflector that is detected by each said optical sensing portion.

12. A system as in claim 11 wherein said remotely controllable means comprises:

a plurality of first and second support pairs fixedly coupled to said housing, each of said plurality of first and second support pairs supporting said body portion of one of said plurality of optical sensors while allowing axial movement thereof;

a plurality of clamps, each of said plurality of clamps coupled to said body portion of one of said plurality of optical sensors;

a plurality of screws, each of said plurality of screws cooperating with one of said plurality of clamps and one of said plurality of first and second support pairs wherein rotation of each of said plurality of screws moves one of said plurality of clamps to cause said axial movement; and a plurality of control cables, each of said plurality of control cables coupled to one of said plurality of screws for turning same from a remote location.

* * * * *